United States Patent [19]

Banks et al.

[11] 4,426,051

[45] Jan. 17, 1984

[54] AIRCRAFT CONTAINER DELIVERY SYSTEM HAVING A POSITIVE RELEASE GATE

[75] Inventors: Eddie D. Banks, Renton; Gerald C. Simmons, Bothell; Roger F. Roberts, Auburn, all of Wash.

[73] Assignee: Boeing Commercial Airplane Company, Seattle, Wash.

[21] Appl. No.: 253,189

[22] Filed: Apr. 13, 1981

[51] Int. Cl.³ .............................................. B64D 1/10
[52] U.S. Cl. ................................. 244/137 R; 410/101; 410/92
[58] Field of Search ............ 244/118.1, 132 R, 138 R, 244/151 A, 151 B; 294/83 R, 84, 101; 410/77, 85, 92, 96, 97, 101, 104, 106, 108; 114/252, 218

[56] References Cited

U.S. PATENT DOCUMENTS

| | | | |
|---|---|---|---|
| 87,751 | 3/1869 | Bachelder | 114/218 |
| 1,242,809 | 10/1917 | Irwin | 294/83 R |
| 1,675,896 | 7/1928 | Lyda | 294/84 |
| 2,774,560 | 12/1956 | Johnson . | |
| 2,858,774 | 11/1958 | Batten | 410/97 |
| 3,093,092 | 6/1963 | Martin et al. . | |
| 3,112,090 | 11/1963 | Luchford et al. . | |
| 3,134,154 | 5/1964 | Smith et al. | 294/83 R |
| 3,276,729 | 10/1966 | Jacobs . | |
| 3,335,983 | 8/1967 | Mollon et al. . | |
| 3,357,372 | 12/1967 | Bader . | |
| 3,398,917 | 8/1968 | Grabe . | |
| 3,401,905 | 9/1968 | Rohrlick . | |
| 3,424,410 | 1/1969 | Galaup . | |
| 3,610,674 | 10/1971 | Janssen | 294/101 |
| 3,642,235 | 2/1972 | Criley et al. . | |
| 3,670,999 | 6/1972 | Leger . | |
| 3,801,051 | 4/1974 | Hosterman et al. . | |
| 4,303,213 | 12/1981 | Bolender et al. | 244/137 R |

FOREIGN PATENT DOCUMENTS

| | | | |
|---|---|---|---|
| 1166096 | 3/1964 | Fed. Rep. of Germany | 244/137 R |
| 1234777 | 10/1960 | France . | |
| 916264 | 1/1963 | France . | |

*Primary Examiner*—Galen L. Barefoot
*Attorney, Agent, or Firm*—Delbert J. Barnard

[57] ABSTRACT

A container delivery system by which cargo containers are dropped from an airplane in which release gates are generally centrally positioned and longitudinally spaced in the cargo space of the airplane. The containers are secured forwardly and rearwardly by straps extending thereacross from one athwartship aircraft portion to another, generally from one outer side to the center. Release gates are generally positioned in central longitudinal rows so that the containers may be dropped out of a rear door when the door is opened, and the containers are released by opening the release gates which secure the straps to the central portion of the aircraft. A release gate secures one end of a rearwardly holding strap so that the one end of the strap is freed to allow respective containers to move rearwardly on rollers in the aircraft deck when the respective gate is opened.

13 Claims, 9 Drawing Figures

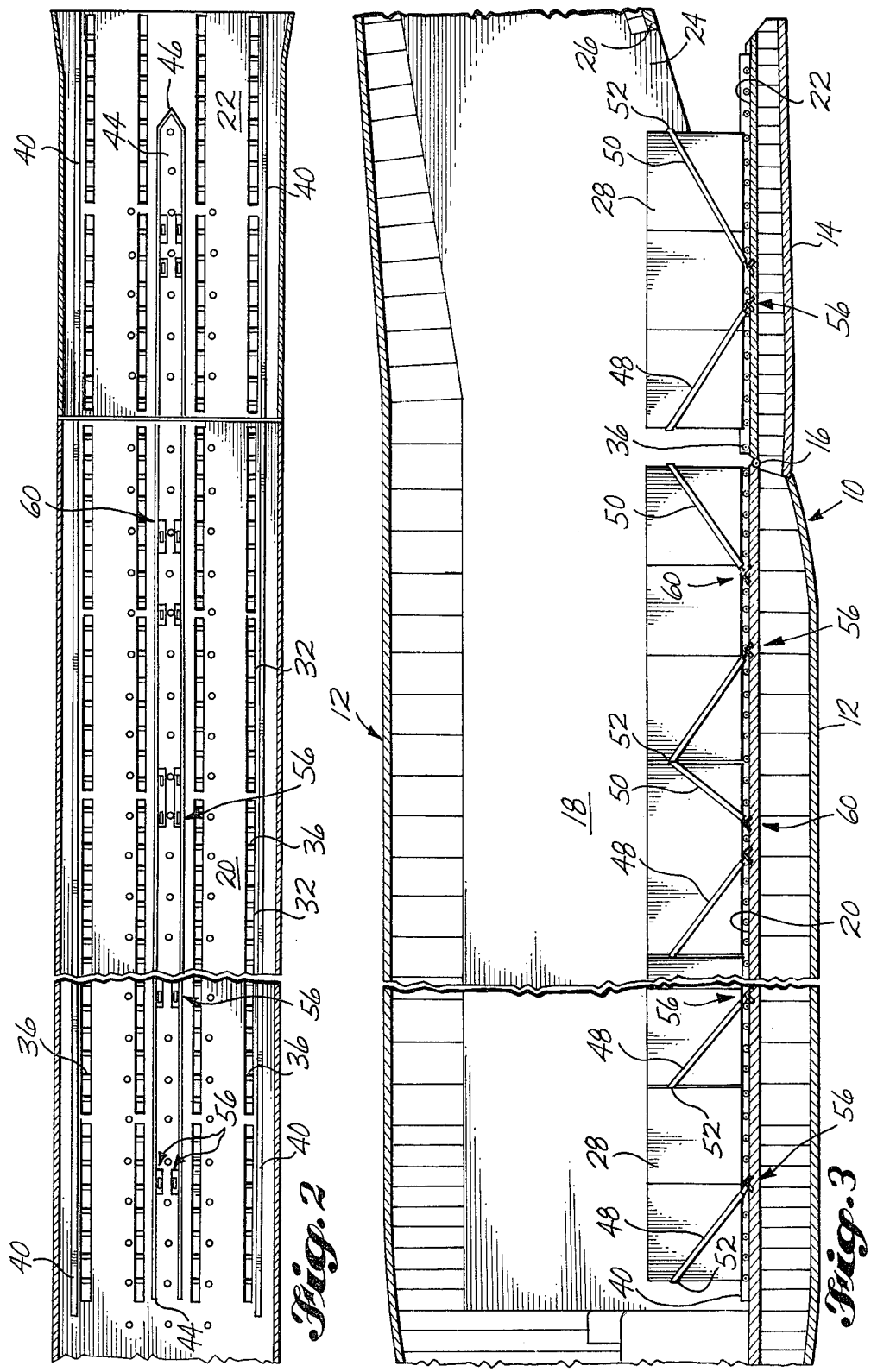

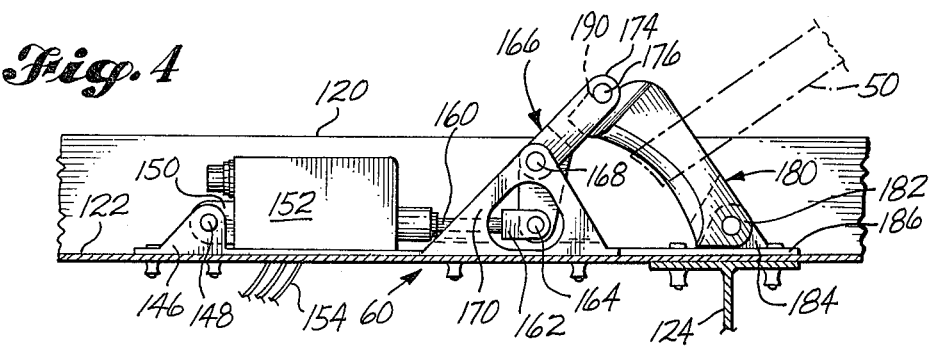
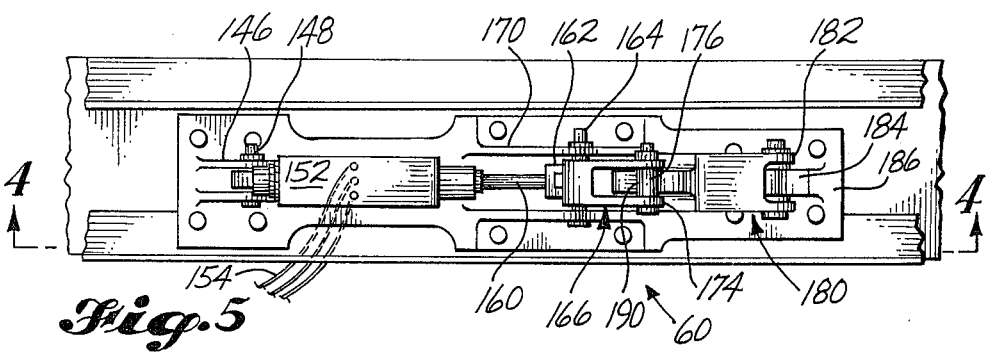
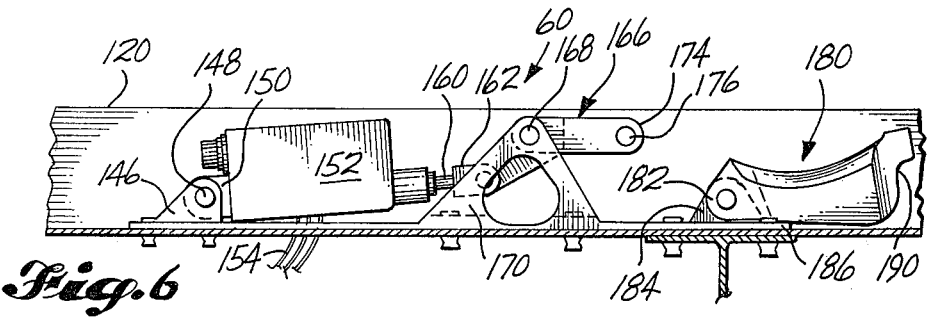
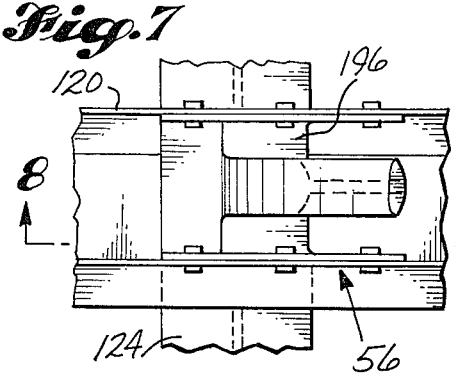
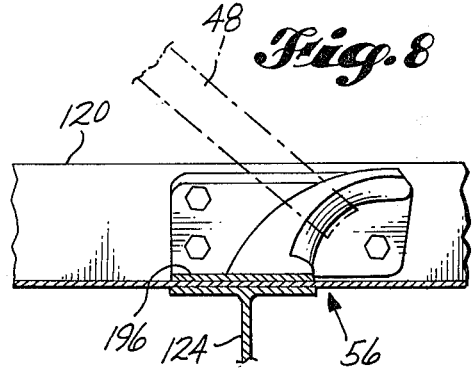

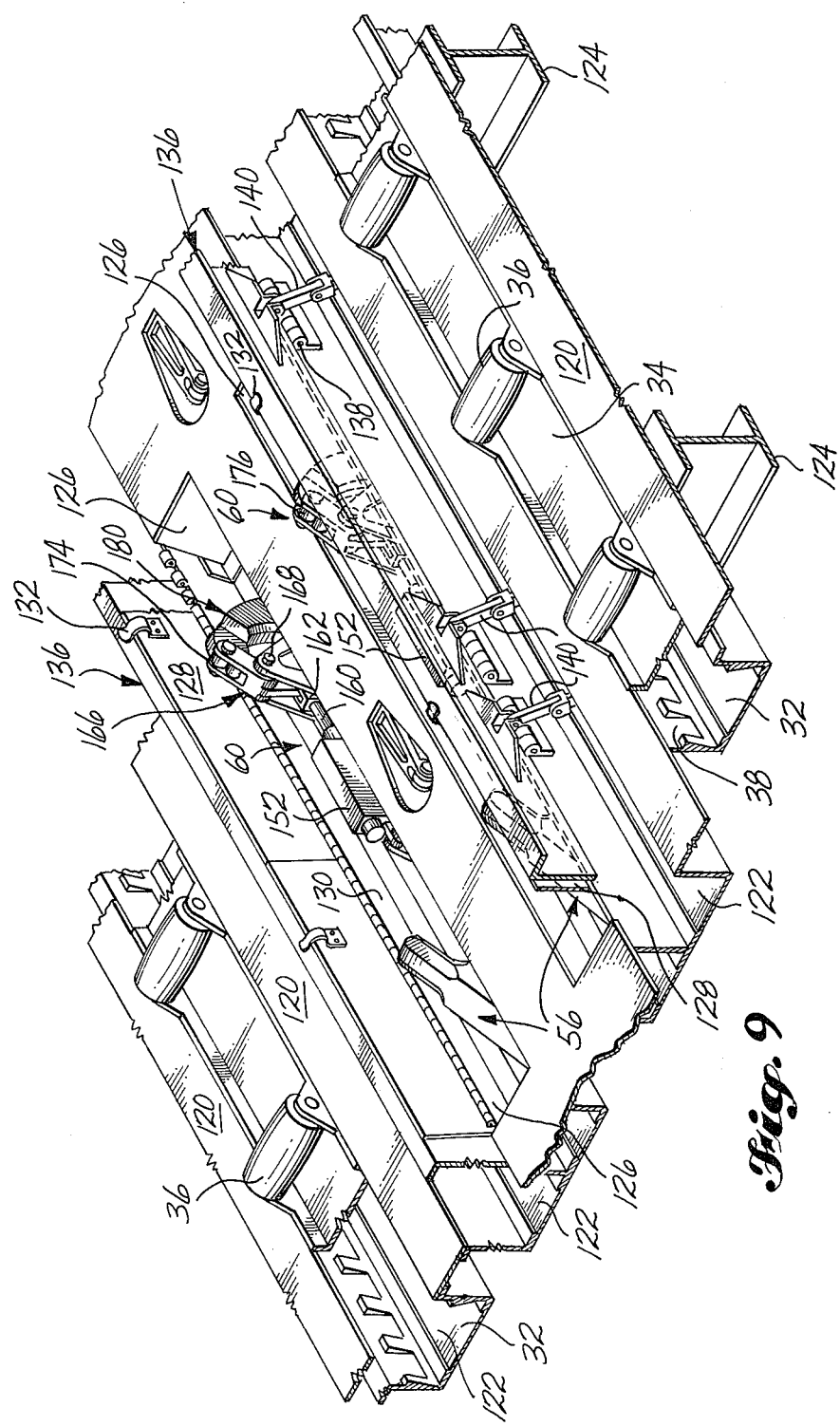

AIRCRAFT CONTAINER DELIVERY SYSTEM HAVING A POSITIVE RELEASE GATE

DESCRIPTION

TECHNICAL FIELD

The invention relates to a system by which containers are dropped from airplanes, generally through an opened rear door. The dropped containers are typically suspended from parachutes after they are free of the aircraft. The invention more particularly relates to positive release mechanisms, which when actuated, permit the containers to move rearwardly on rollers out of the opened rear aircraft door, the aircraft being tilted forwardly upwardly about 7°.

BACKGROUND ART

Container delivery system air-drops are presently effected on existing airplanes by the use of a guillotine knife to cut release gates which are comprised of one or more layers of nylon webbing that hold the containers in the airplane. A winch cable is strung the length of the cargo compartment to reach the release gates toward or at the after end of the cargo floor, the cable being used to release the guillotine knife for individual cuts.

Slackness in the release gates due to container shifting, and dull knives make the system unreliable at times so as to delay the release and to thereby cause the containers to overshoot the drop zone.

A search of the patent literature discloses a number of systems which propose solutions to this problem. For example, U.S. Pat. No. 3,670,999 shows a link 49, FIGS. 5, 8 and 9, held in place by link retainer 78, pivoted at 79 and operated by links 80 and 81. The link retainer has a pair of rollers 84 and 85 which engage the link 49. Links 80 and 81 are operated by an actuating link 87 which is operated either by a cam 46 on a shaft 38 or by a solenoid 90.

U.S. Pat. No. 3,398,917 illustrates a device for controlling discharge load carrying pallets from an airplane in which rails support the pallets and latches hold the pallets in place on the rails with a shaft connected at the latches to operate them into a release position. There are means provided to actuate the shaft.

U.S. Pat. No. 3,357,372 discloses a cargo holding system wherein pallets are individually fastened or released by a control device operable from either end. The system comprises notched pallets which are held at various locations along a rail by series of spring biased latches. The operation of the latches is controlled by a long cam which extends the length of the rail and which has many positions which provide for the fastening and releasing of each pallet individually.

The following patents disclose related systems:
U.S. Pat. No. 3,335,983
U.S. Pat. No. 3,801,051
U.S. Pat. No. 2,774,560
U.S. Pat. No. 3,424,410
U.S. Pat. No. 3,401,905
U.S. Pat. No. 3,642,235
U.S. Pat. No. 3,276,729
U.S. Pat. No. 3,112,090
U.S. Pat. No. 3,093,092
British Pat. No. 916,264
French Pat. No. 1,234,777

DISCLOSURE OF THE INVENTION

The invention is an aircraft container delivery system and releasing gates therefor. The containers are secured forwardly and rearwardly in a cargo compartment by straps extending across the containers from one athwartship aircraft portion to another. The containers are dropped out of a rear door of the aircraft when the door is opened and the containers are released by the releasing gates.

One end of a rearwardly holding strap is secured adjacent an outer side of the aircraft floor and the other end is secured athwartship thereof, generally centrally positioned so that there are two longitudinal rows of containers held in position rearwardly by centrally positioned released gates. Each releasing gate is opened at one end of a rearwardly holding strap which is freed to allow containers to move rearwardly on rollers in the aircraft deck.

All of the containers may be released at the same time or may be released sequentially, progressing from rearward positions to forward positions in the aircraft.

Each releasing gate is operated by an actuator in the form of a motor which is tied into an airplane computer.

There are generally two rows of centrally positioned releasing gates, each having a motor secured to a support member, secured on an aircraft subfloor. Each motor is adapted to extend upwardly therefrom toward but below the aircraft floor. A rod extends from the motor, the rod being adapted to be reciprocated predetermined amounts by the motor.

A link is pivotally supported on a fulcrum intermediate the link's ends and the fulcrum is supported by means secured to the subfloor. The rod has its end extending from the motor pivotally engaged with one end of the link and a roller is secured adjacent the other end of the link, the roller extending transversely to the direction of the link.

A gate pivot member is pivotally secured to the subfloor and it is pivotal from an open position to a gate closing position adjacent the roller. The rod is adapted to pivot the link from a gate unlocked position to a gate locked position, when the gate pivot is in the closed position, by moving the roller against the gate pivot.

Each gate pivot in the closed position has a shoulder facing generally upwardly and generally toward the link so that when the link is moved to the locked position the roller is moved onto the shoulder to lock the gate.

Controls, typically in the form of limit switches, are connected to the motor to reciprocate the rod to pivot the link to three positions, namely, a first position to raise the roller above the shoulder when the gate pivot is in the closed position and from which the gate pivot will be opened by a rearward force on a container holding strap; a second position to lower the roller on the shoulder to lock the gate pivot; and a third position to pivot the roller below the floor when the gate pivot is in the open position, also below the floor.

When the air-drop is to occur the aircraft is tilted upwardly about 7° at the forward end and the rear door is opened. When the link is pivoted to unlock the gate pivot, any rearward force on a strap causes it to be released from the gate pivot and continuing container force on the strap causes it to be forced to the side of the aircraft as the cargo moves outwardly on rollers and out the door. The unlocking of the gate, thus, provides a positive and immediate air-drop when the motors are actuated by signal from the airplane computer.

Further objects and advantages of the invention may be brought out in the following part of the specification wherein small details have been described for competence of disclosure, without intending to limit the scope of the invention which is set forth in the appended claims.

BRIEF DESCRIPTION OF THE DRAWINGS

FIG. 2 is a plan view of an aircraft cargo floor, similar to that shown in FIG. 1, but without the cargo;

FIG. 3 is a side elevational view in cross section of an aircraft cargo space having containers loaded and secured on the cargo floor and on the inner door surface;

FIG. 4 is a side elevational view of a gate release according to the invention, in the closed and locked position, taken along the line 4—4 in FIG. 5;

FIG. 5 is a plan view of the gate release in the position shown in FIG. 4;

FIG. 6 is a side elevational view of the gate release in the open position, with all parts thereof positioned below the level of the aircraft floor;

FIG. 7 is a plan view of a hook for receiving an end of a forwardly holding cargo strap;

FIG. 8 is a side elevational view of a forwardly holding hook taken along the line 8—8 in FIG. 7; and FIG. 9 is a fragmentary pictorial view illustrating the arrangement of the cargo supporting rollers, the rearwardly holding gate releases, and the forwardly holding hooks in the aricraft cargo floor.

BEST MODE FOR CARRYING OUT THE INVENTION

Figure 1:
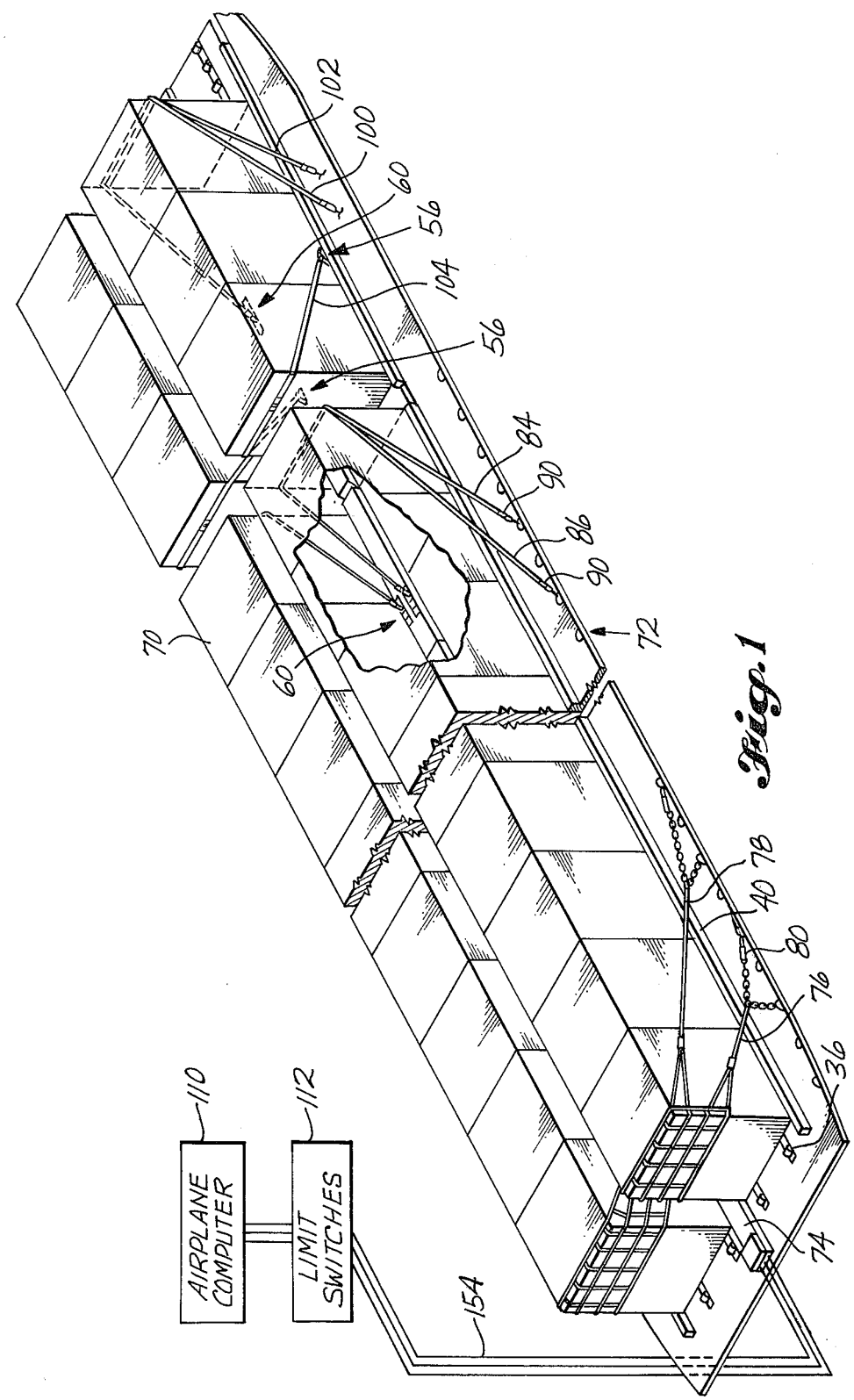
FIG. 1 is a pictorial view of an aircraft cargo floor having cargo containers secured thereon by straps extending from an outer portion of the floor, across the containers to a central portion of the floor, where they are held by a gate release according to the invention.

Referring again to the drawings, there are shown in FIGS. 1-3 partial views of cargo spaces of aircraft, illustrating space unloaded and spaces with different loading arrangements. In FIG. 3 an aircraft, generally designated as 10, has a fuselage 12 and a rear ramp door 14 in the open position. The door opens and closes on hinges at 16 by means of a hydraulic actuator not shown.

A cargo space 18 has a flat floor or deck surface 20 and the door 14 has a similar floor 22, and which, as shown, when the door is open, the floor levels 20 and 22 are substantially in the same plane. The door opening 24 extends laterally inwardly of the fuselage portion 26 to permit the containers 28 to pass inwardly and outwardly therethrough. The containers are shown to be various sizes but have a limited height with respect to that of the door opening above the door floor 22.

As shown in FIGS. 2 and 9, grooves 32 are formed in the aircraft floor to receive roller tracks 34 on which rollers 36 are mounted and longitudinally spaced throughout the cargo carrying area. The roller tracks 34 have protrusions, not shown, which fit into wedge shaped slots 38 to prevent the tracks from moving longitudinally. Outer guide rails, as 40 in FIG. 3, limit the lateral movement of the cargo containers as they are moved inwardly and outwardly on the rollers 36.

The cargo containers 28 shown in FIG. 3 are one of two rows of containers and are in the position as though they were in the upper half of FIG. 2 between the outer side guide rails 40 and the generally centrally positioned guide rails 44. The rearward ends of the central guide rails 44 have an adjustable pointed guide 46 thereon to aid in moving the cargo to the left or right of the center and between the rails 40 and 44. The cargo containers 28 are secured in place by means of forwardly holding straps 48 and rearwardly holding straps 50. The straps are all held on the same height on the containers either by a groove at 52 or a protrusion such as a hook or hooks at the same height.

Guide rail 44 is not shown in FIG. 3 but the straps are secured inwardly toward the center. The forwardly holding straps are secured on forward restraint hooks 56, shown in detail in FIGS. 7-9. The rearwardly holding straps 50 are secured along the center of the floor by release gates 60, shown in detail in FIGS. 4-6 and 9.

In FIG. 1 a similar arrangement of containers 70 are shown secured to an aircraft floor 72 in a container delivery system whereby the containers are dropped out of the rear door of an aircraft and suspended on parachutes, not shown. Here the containers are moved on rollers 36 and are guided adjacent the outer lateral portions of the aircraft by rails 40. Between the two rows of containers, there is a box rail 74 so that containers are fitted for limited lateral movement between the rails 40 and the box 74.

The box also contains the forwardly holding restraint members 56 and the release gates 60. The outer ends of the forwardly holding straps 76 and 78 are secured adjacent the outer lateral walls of the aircraft and have tensioners 80 to hold the cargo containers securely in place during normal travel of the aircraft. Similarly, the rearwardly holding straps 84 and 86 have tensioners 90 to hold the cargo snugly. The same is also true of the rearwardly holding straps 100 and 102. The forwardly holding straps 104 are also tightly held in position by two hooks 56.

The gate releases 60 are operated by an airplane computer 110 which has limit switches 112 or similar controls in the circuitry to control the operation of the gate releases 60, the circuitry 154 being extended to the gate releases through the longitudinal box 74.

In FIGS. 4-9 the forwardly holding strap hooks 56, the gate releases 60, and the surrounding floor, and subfloor structures are shown in detail. The floor level is indicated as at 120 and the subfloor is indicated as at 122, the subfloor being directly supported by athwartship I-beams 124. In the arrangement shown in FIG. 9, the forwardly holding restraints are shown in the same recesses 126 as the release gates 60, both being secured and supported on the subfloor level 122. When a release gate is in the lowered position, shown in FIG. 6 and not in operation, the recess 126 is adapted to be closed by a cover 128, FIG. 9, the cover being hingedly engaged to a vertical member 130. When closed, the cover 128 is snapped into place by spring clips 132.

When the covers 128 are open, they are held in an upward position by center guide rails 136, movable on hinges 138 from a flat position flush with the floor surface 120 to an upright position as shown in FIG. 9. In the upright position the guide rails are supported by means of a plurality of over-center brackets 140. Thus, when the cargo is moved on the rollers 36, it is restrained against inward movement by the outer edges of the guide rails 136.

As best seen in FIGS. 4-6, the release gates 60 are secured to a subfloor member within a recess such as 126. The release gates are comprised of a vertical clevis 146, secured to the subfloor, and having a fulcrum pin 148 extending through a bore through the clevis members and through a motor ear 150 to pivotally secure a release gate motor 152 to the subfloor. Each motor is a 28 volt DC, having a high r.p.m. to create a very substantial torque on start for positive action. The motor is connected by wires 154 to the limit switches 112 and to the airplane computer 110. The rotor shaft, not shown, is substantially reduced in speed by reduction gears, and drives a pinion engaged in a rack connected to a rod 160 which is reciprocated by the motor as the rack is driven forwardly and rearwardly.

The rod 160 has a clevis 162 on its end, and extending therein and pivotally engaged thereto at 164 is one end of a link or bell crank 166. The bell crack 166 is supported on a fulcrum pin 168, the pin 168 being supported by a stationary clevis 170 secured to and extending upwardly from the subfloor. The outer or rearward end of the bell crank 166 has a clevis 174 in which is supported a roller 176, transverse thereto.

Rearwardly of each bell crank is a gate pivot 180 having a clevis 182 at its lower end, pivotally engaged to an ear 184, secured to the subfloor by means of a plate 186. At the upper and outer end of the gate pivot, there is a shoulder locking surface 190 which fits within the clevis 174 so as to receive the roller 176 which locks the gate pivot in its closed position, FIGS. 3 and 4.

A gate release 60 is shown in its inoperative position in FIG. 6 with the gate pivot 180 rotated rearwardly and downwardly to be relatively horizontally positioned against the plate 186 on the subfloor. The reciprocating rod 160 has been fully withdrawn by the action of the pinion on the rack. In this position the bell crank is rotated so that the clevis 174 is substantially horizontal and below the floor surface and the motor is pivoted upwardly. In order to rotate the bell crank to raise the roller 176 to its highest position and the pivot 164 to its most rearwardly position, not shown, the airplane computer is actuated to rotate the motor and to cause one of the three limit switches to stop the bell crack in the aforesaid position. The gate pivot is then rotated upwardly to the position shown in FIGS. 4 and 5 and a loop on the end of a rearwardly holding container strap 50 is slipped over the gate pivot as indicated in phantom outline in FIG. 4. The gate pivot 180 is then in the closed but unlocked position, also not shown. To lock the gate the computer is then actuated to retract the rod 160 a small amount to cause the roller to be moved into holding contact on shoulder 190 of the gate pivot. The gate pivot and the loop on the end of a cargo strap 50 is then locked into place. The outer ends 100 and 102 of the straps as shown in FIG. 1 may then be secured in place and the tensioners are effective to tighten the straps on the containers.

As shown in FIGS. 7 and 8, the centrally positioned forwardly restraining hooks 56 are secured in a recess such as 126 or in a separate recess remote from a gate release. Each hook 56 is secured to a plate 196 and extending upwardly from the plate are sidewalls which are secured to the recessed walls below the floor and above the subfloor. To restrain the cargo containers in the forward position, a loop on the inner ends of the straps 48 is slipped over the hook 56 and the other end of the other ends of the straps, as at 80 or 56, FIG. 1, are tightened by tensioners adjacent the outer edges of the floor. After the straps are thus engaged, the cargo containers are secured within the aircraft for carrying to the drop zone, where all of the cargo may be released at once or the cargo may be released sequentially, starting at the rearward end of the aircraft.

As the drop zone is approached, the rear door, as 14, is opened, FIG. 3, and individual gates 60 are opened progressively inwardly, or simultaneously, as indicated, by energizing the various motors 152 to cause the rods 160 to be moved rearwardly to pivot the bell crank and lift the rollers off of the shoulders 190 of the gate pivots. When a roller is moved off of a gate pivot, it is then unlocked, and the aircraft being tilted upwardly, forwardly about 7° causes the containers to exert a force against the rearwardly holding straps 50, for example, to pull the strap loop at the inner end off of a gate pivot 180 and free the cargo containers at the center in the arrangements shown in FIG. 9 and FIGS. 3 and 4. When this occurs, the cargo moves out of the aircraft over the edge of the open door and the parachutes, not shown, are opened to permit the cargo to descend at a non-damaging speed. The inner ends of the straps, having been loosened, are thrown to the outer side of the plane where they remain tied.

The forward restraint straps 48, FIG. 3, and 104, FIG. 1, held at both ends by hooks 56, are secured to the containers and move out of the airplane with them. The straps 76 and 78 remain in the airplane, FIG. 1.

When all the cargo has been dropped, the door 14 is closed and the gate releases are ready for positioning, as shown in FIG. 6. The gate pivot 180 will have fallen to the position shown and the motor is then actuated to return the rod 160 to its fully retracted position so as to pivot the motor upwardly on the pin 148 and to rotate the bell crank downwardly at the rearward end to lower the clevis 174 below the floor level so that the covers 128 can be lowered to protect the release gate mechanisms. At the same time individual covers for the forwardly holding hooks 56 are also lowered and the center guide rails 136 are lowered by releasing the overcenter devices 140 which fold down into the area below the floor and adjacent the subfloor.

The invention and its attendant advantages will be understood from the foregoing description and it will be apparent that various changes may be made in the form, construction, and arrangements of the parts of the invention without departing from the spirit and scope thereof or sacrificing its material advantages. I do not wish to be restricted to the specific forms shown or uses mentioned except as defined in the accompanying claims.

What is claimed is:

1. For use in an aircraft, releasing gates in a container delivery system in which the containers are secured forwardly and rearwardly by straps extending across the containers from one athwartship aircraft portion to another, and in which the containers are dropped out of a rear door when the door is opened and the containers are released by opening the gates, one gate securing one end of a rearwardly holding strap so that the one end of the strap is freed to allow respective containers to move rearwardly on rollers in the aircraft deck when the respective gate is opened, each gate comprising:
a support member adapted to be secured to an aircraft subfloor;
a motor pivotally secured adjacent one end to said support member and adapted to extend upwardly therefrom toward and below an aircraft floor;

a rod extending from the other end of said motor, said motor being adapted to reciprocate said rod predetermined amounts;

a bell crank-shaped link pivotally supported intermediate its ends on a fulcrum, said fulcrum being supported by means adapted to be supported on said subfloor;

said rod having its end extending from said motor pivotally engaged with one end of said link;

a link roller secured adjacent the other end of said link and extending transversely thereto; and a gate pivot member pivotally secured on means adapted to be secured on said subfloor;

said gate pivot being pivotal from a gate open position below the floor level to a gate closed position extending above the floor level;

said rod being adapted to pivot said link from a gate unlocked position to a gate locked position, when said gate pivot is in the closed position, by moving said roller against said gate pivot above the floor level.

2. The invention according to claim 1 in which:

said gate pivot in the closed position has a shoulder facing generally upwardly and generally toward said link so that when said link is moved to the locked position, the roller is moved onto the shoulder above the floor level to lock the gate.

3. The invention according to claim 1 in which:

said motor is pivotally secured to said support member adjacent one end of said motor;

said rod extending from the other end of said motor.

4. The invention according to claim 3 in which:

controls are connected to the motor to reciprocate the rod and to pivot the link to three positions, including a first position to raise the roller above the shoulder above the floor level when the gate pivot is in the closed position and from which the gate pivot will be opened by a rearward force on the strap and lowered below the floor level, a second position to lower the roller on the shoulder above the floor level to lock the gate pivot, and a third position to pivot the link roller and link below the floor when the gate pivot is in the open position.

5. An aircraft container delivery system, comprising:

straps extending athwartship in an aircraft to extend across containers to secure them forwardly and rearwardly in the aircraft;

said straps being securable adjacent the aircraft floor adjacent their respective opposite ends;

each rearwardly securing strap having a gate to secure and release one end thereof so that when the one end is released each container held by the respective strap is free to move rearwardly in the aircraft;

each gate having a support member secured to a subfloor in the aircraft;

a motor pivotally secured adjacent one end to a support member secured to said subfloor and extending upwardly therefrom to a position below an aircraft floor;

a rod extending from the other end of said motor, said motor being adapted to reciprocate said rod predetermined amounts;

a bell crank-shaped link pivotally supported intermediate its ends on a fulcrum, said fulcrum being supported by means supported on said subfloor;

said rod having its end extending from said motor pivotally engaged with one end of said link;

a link roller secured adjacent the other end of said link and extending transversely thereto; and a gate pivot member pivotally secured on means secured on said subfloor;

said gate pivot being pivotal from a gate open position below the floor level to a gate closed position extending above the floor level;

said rod being adapted to pivot said link from a gate unlocked position to a gate locked position, when said gate pivot is in the closed position, by moving said link roller against said gate pivot above the floor level.

6. The invention according to claim 5 in which:

said straps extend athwartship from respective sides of said aircraft to approximately athwartship centers thereof to hold two longitudinal rows of containers, one row being on each side of the athwartship centers.

7. The invention according to claim 6 in which:

rearwardly extending hooks are secured on said subfloor adjacent said athwartship centers to secure ends of forwardly holding straps below the floor level.

8. The invention according to claim 6 in which:

a respective gate is positioned to rearwardly secure containers on each side of the athwartship centers.

9. The invention according to claim 7 in which:

said gate pivot in the closed position has a shoulder facing generally upwardly and generally toward said link so that when said link is moved to the locked position, the link roller is moved onto the shoulder to lock the gate above the floor level.

10. The invention according to claim 9 in which:

controls are connected to the motor to reciprocate the rod and to pivot the link to three positions including a first position to raise the link roller above the shoulder above the floor level when the gate pivot is in the closed position and from which the gate pivot will be opened by a rearward force on the strap, a second position to lower the roller on the shoulder above the floor level to lock the gate pivot, and a third position to pivot the link roller and link below the floor when the gate pivot is in the open position.

11. The invention according to claim 10 including:

covers hinged to said floor for forming a floor surface above said hooks, motors, links, link rollers, and gates when said links, link rollers, and gates are below the floor level;

said covers being raised above the floor to allow said links, link rollers, and gates to be raised above the floor.

12. For use in an aircraft, releasing gates in a container delivery system in which the containers are secured forwardly and rearwardly by straps extending across the containers from one athwartship aircraft portion to another, and in which the containers are dropped out of a rear door when the door is opened and the containers are released by opening the gates, one gate securing one end of a rearwardly holding strap so that the one end of the strap is freed to allow respective containers to move rearwardly on rollers in the aircraft deck when the respective gate is opened, each gate comprising:

a support member adapted to be secured to an aircraft subfloor;

a motor pivotally secured adjacent one end to said support member and adapted to extend upwardly therefrom toward and below an aircraft floor;

a rod extending from the other end of said motor, said motor being adapted to reciprocate said rod predetermined amounts;

a bell crank-shaped link pivotally supported intermediate its ends on a fulcrum, said fulcrum being supported by means adapted to be supported on said subfloor;

said rod having its end extending from said motor pivotally engaged with one end of said link below the floor level;

a roller secured adjacent the other end of said link and extending transversely thereto;

a gate pivot member pivotally secured on means adapted to be secured on said subfloor;

said gate pivot being pivotal from a gate open position below the floor level to a gate closed position extending above the floor level;

said rod being adapted to pivot said link from a gate unlocked position to a gate locked position, when said gate pivot is in the closed position, by moving said roller against said gate pivot above the floor level;

said gate pivot in the closed position having a shoulder facing generally upwardly and generally toward said link so that when said link is moved to the locked position, the roller is moved onto the shoulder to lock the gate above the floor level; and controls being connected to the motor to reciprocate the rod and to pivot the link to three positions, including a first position to raise the roller above the shoulder above the floor level when the gate pivot is in the closed position and from which the gate pivot will be opened by a rearward force on the strap, a second position to lower the roller on the shoulder to lock the gate pivot above the floor level, and a third position to pivot the roller and link below the floor level when the gate pivot is in the open position.

13. An aircraft container delivery system, comprising:

straps extending athwartship in an aircraft to extend across containers to secure them forwardly and rearwardly in the aircraft;

said straps being securable adjacent the aircraft floor adjacent their respective opposite ends;

said straps extending athwartship from respective sides of said aircraft to approximately athwartship centers thereof to hold two longitudinal rows of containers, one row being on each side of the athwartship centers;

rearwardly extending hooks being secured on a subfloor adjacent said athwartship centers to secure ends of forwardly holding straps;

each rearwardly securing strap having a gate to secure and release one end thereof so that when the one end is released each container held by the respective strap is free to move rearwardly in the aircraft;

a respective gate being positioned to rearwardly secure containers on each side of the athwartship centers;

each gate having a support member secured to said subfloor in the aircraft;

a motor pivotally secured adjacent one end to a support member secured to said subfloor and extending upwardly therefrom to a position below an aircraft floor;

a rod extending from the other end of said motor, said motor being adapted to reciprocate said rod predetermined amounts;

a bell crank-shaped link pivotally supported intermediate its ends on a fulcrum, said fulcrum being supported by means supported on said subfloor;

said rod having its end extending from said motor pivotally engaged with one end of said link;

a link roller secured adjacent the other end of said link and extending transversely thereto; and a gate pivot member pivotally secured on means secured on said subfloor;

said gate pivot being pivotal from a gate open position below the floor level to a gate closed position extending above the floor level;

said rod being adapted to pivot said link from a gate unlocked position to a gate locked position, when said gate pivot is in the closed position, by moving said link roller against said gate pivot above the floor level;

said gate pivot in the closed position having a shoulder facing generally upwardly and generally toward said link so that when said link is moved to the locked position, the link roller is moved onto the shoulder to lock the gate above the floor level;

controls being connected to the motor to reciprocate the rod and to pivot the link to three positions including a first position to raise the link roller above the shoulder above the floor level when the gate pivot is in the closed position and from which the gate pivot will be opened by a rearward force on the strap, a second position to lower the roller on the shoulder above the floor level to lock the gate pivot, and a third position to pivot the link roller and link below the floor when the gate pivot is in the open position;

removable fore and aft extending, athwartship spaced rows of container support rollers to support said containers for movement in and out of the aircraft, said rows of container rollers being supported in elongated recesses in the aircraft floor; and covers for forming a floor surface above said hooks, motors, links, link rollers, and gates when said links, link rollers, and gates are below the floor level.

* * * * *